(No Model.) W. PORTEOUS. 6 Sheets—Sheet 1.
SAND MOLDING MACHINE.

No. 587,605. Patented Aug. 3, 1897.

Witnesses.
J. Thomson Cross
E. W. H. ...

Inventor:
William Porteous
by Chas. M. Beck
his Attorney (No Model.) 6 Sheets—Sheet 2.

W. PORTEOUS.
SAND MOLDING MACHINE.

No. 587,605. Patented Aug. 3, 1897.

Witnesses.
J. Thomson Cross
E. W. Hardingham

Inventor:
William Porteous
by Chas. M. Peck
his Attorney (No Model.) 6 Sheets—Sheet 3.
W. PORTEOUS.
SAND MOLDING MACHINE.
No. 587,605. Patented Aug. 3, 1897.
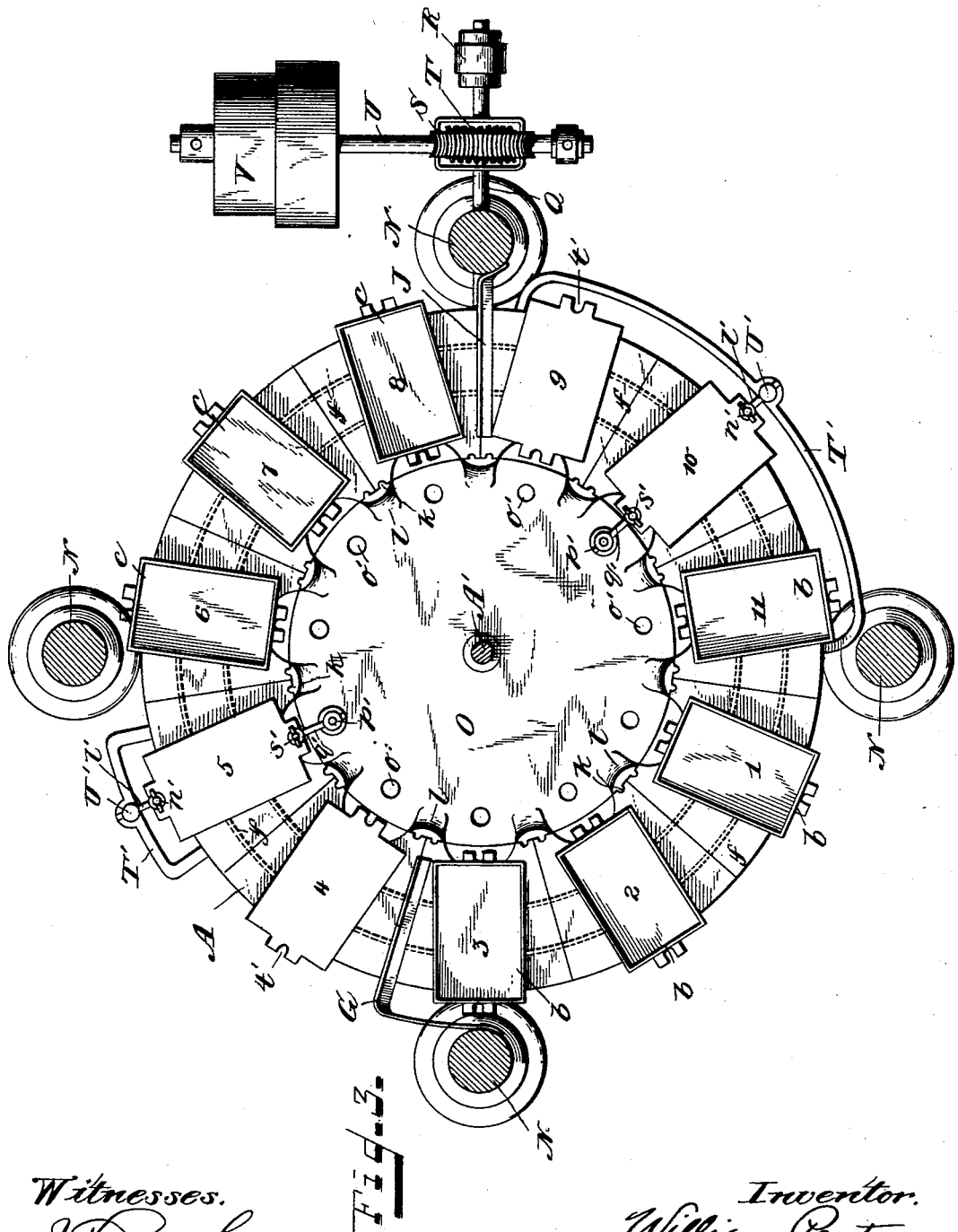
Witnesses.
J. Thomson Cross
E. W. Hardinghaus
Inventor.
William Porteous
by Chas. M. Cox
his Attorney.

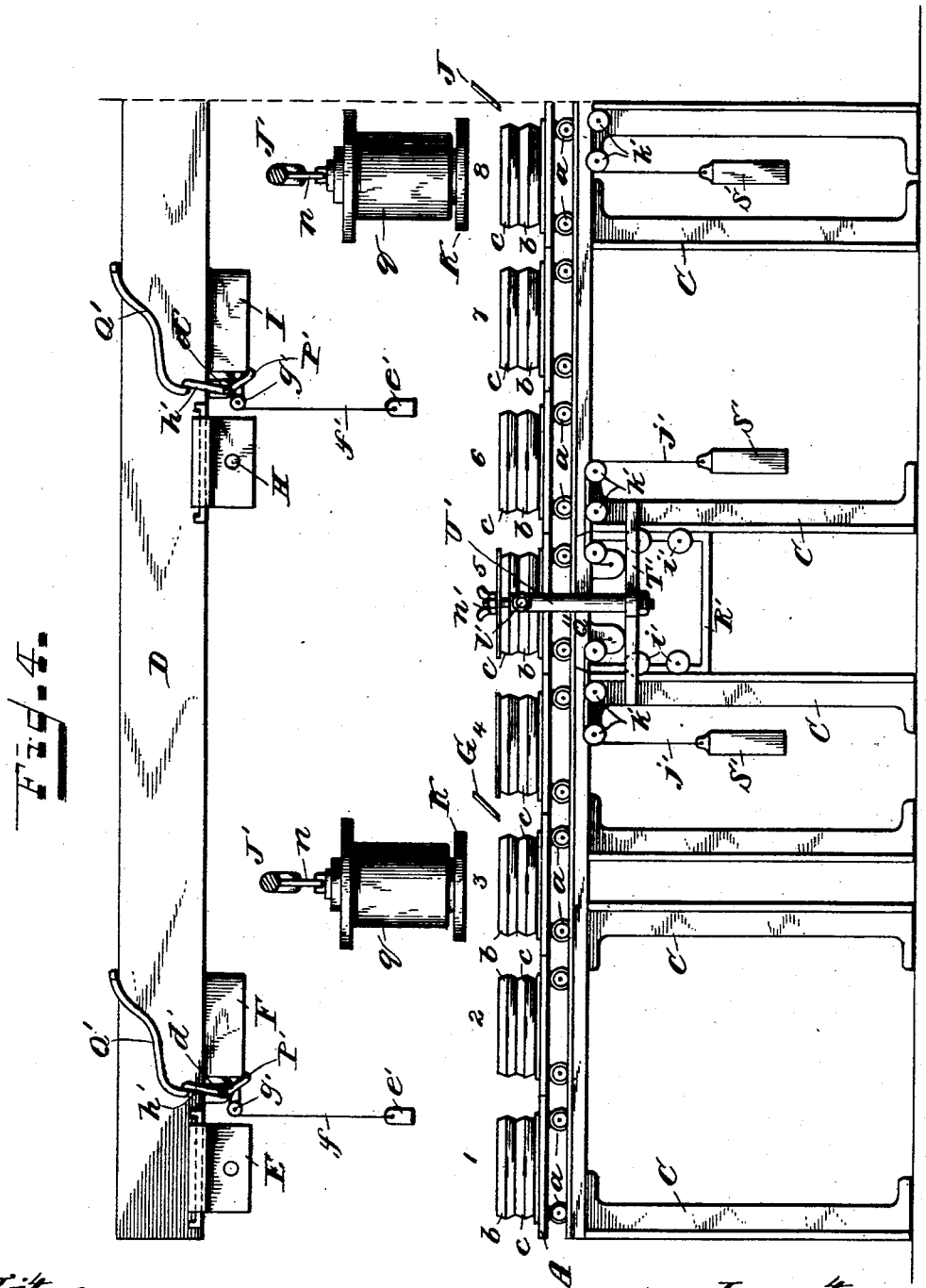

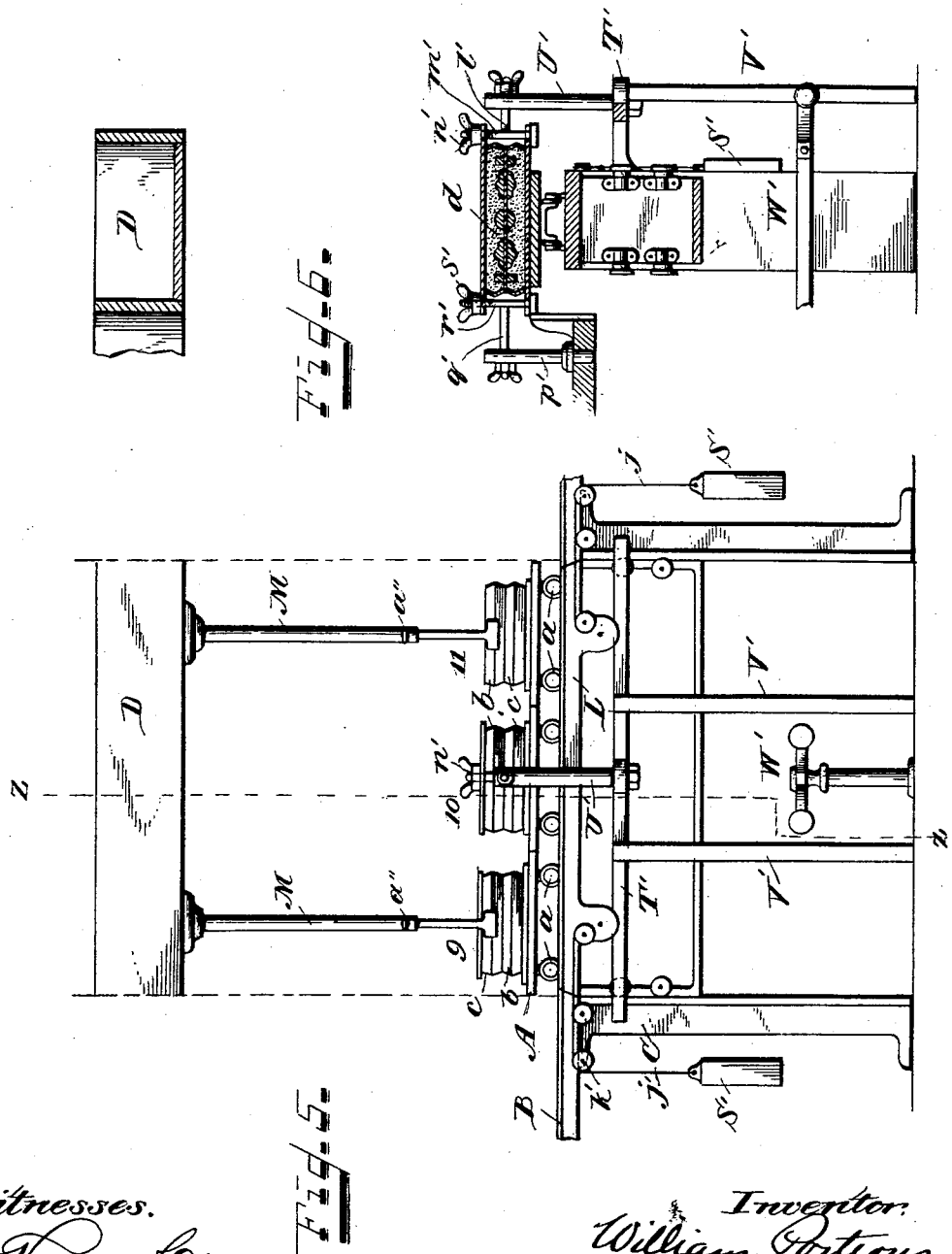

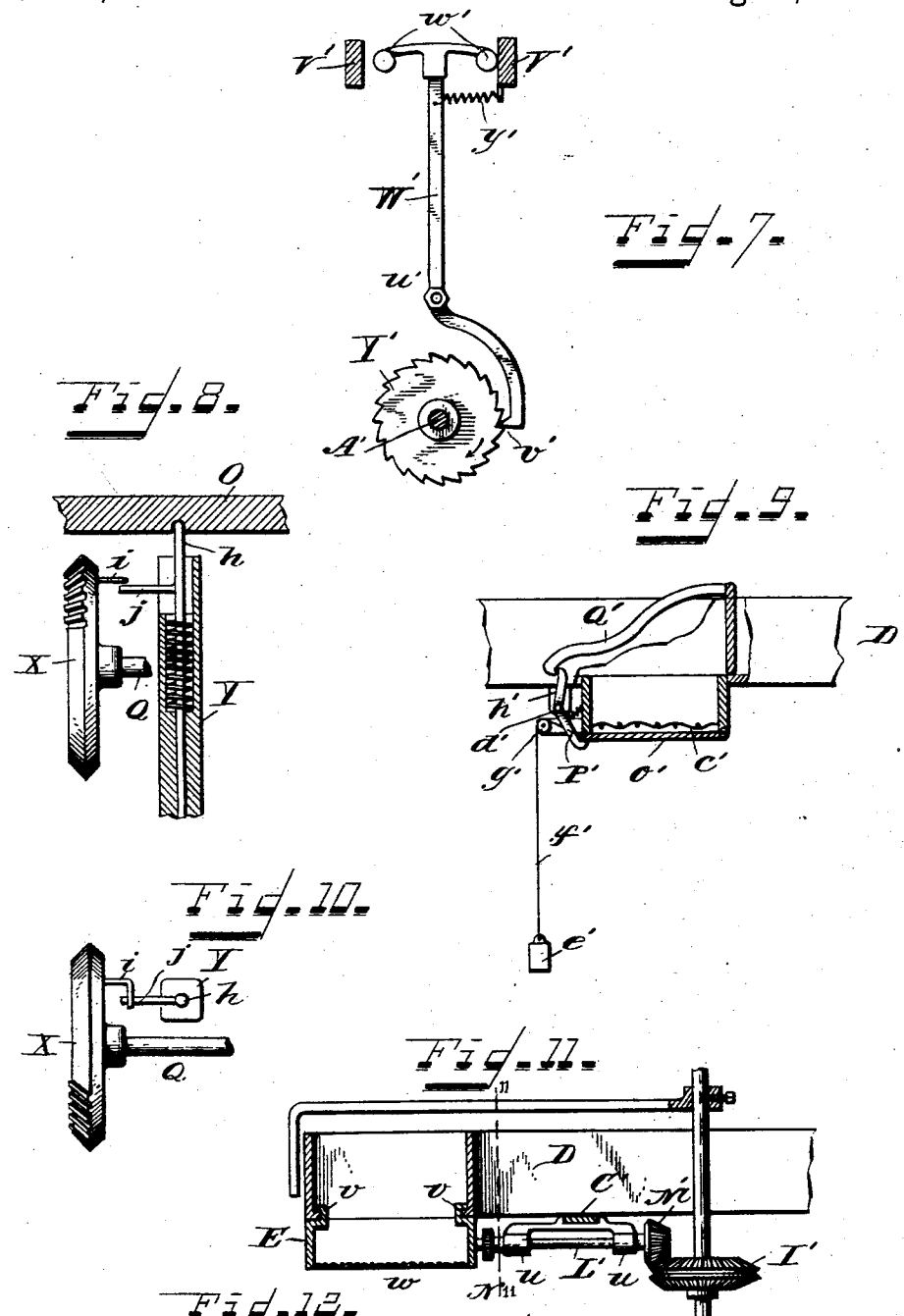

UNITED STATES PATENT OFFICE.

WILLIAM PORTEOUS, OF ELMWOOD PLACE, OHIO.

SAND-MOLDING MACHINE.

SPECIFICATION forming part of Letters Patent No. 587,605, dated August 3, 1897.

Application filed April 23, 1892. Serial No. 430,375. (No model.)

*To all whom it may concern:*

Be it known that I, WILLIAM PORTEOUS, a citizen of the United States, residing at Elmwood Place, in the county of Hamilton and State of Ohio, have invented certain new and useful Improvements in Sand-Molding Machines, of which the following is a full, clear, and exact description, reference being had to the accompanying drawings, forming part of this specification.

My invention relates to machines for making sand molds for castings, and has for its object the production of a machine which will be as nearly automatic as possible, and which will reduce the labor of making such molds to a minimum.

The novelty of my invention will be hereinafter set forth, and specifically pointed out in the claims.

Figure 1:
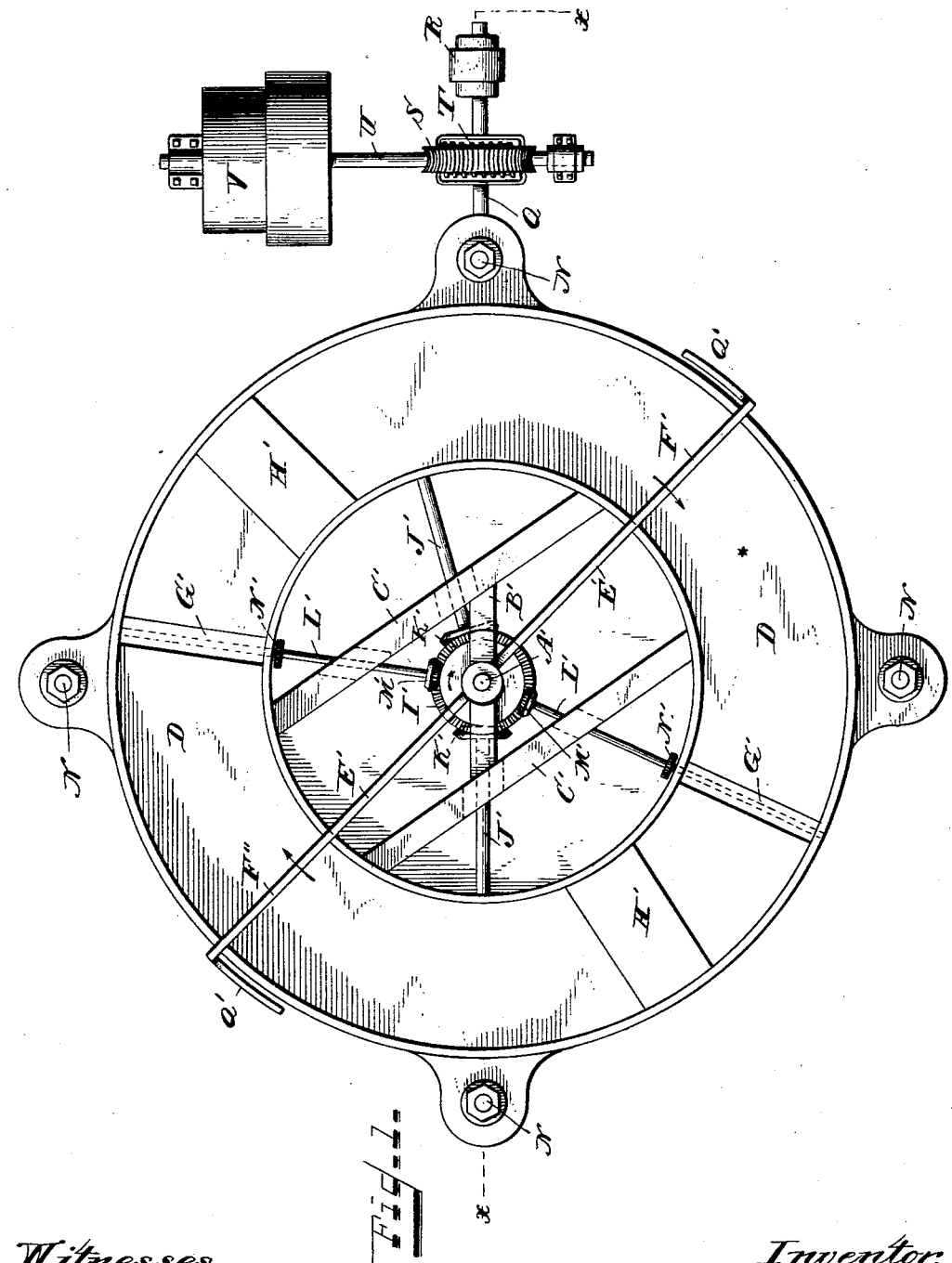
Figure 2:
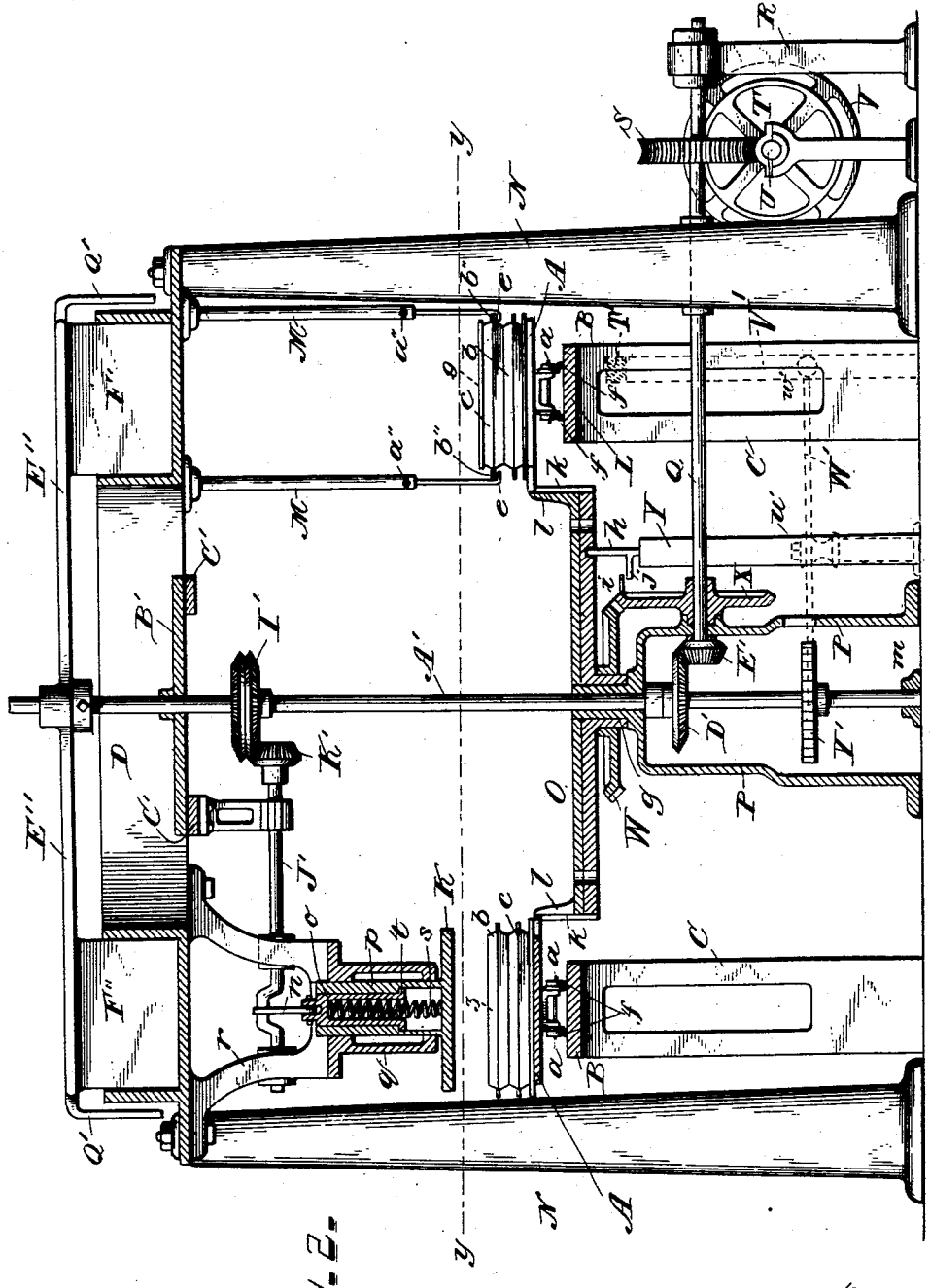

In the accompanying drawings, Figure 1, Sheet 1, is a plan view of a machine embodying my invention. Fig. 2, Sheet 2, is a section, partly in elevation, on the dotted line $xx$ of Fig. 1, with the position of the sweeps changed to bring them into view with the rapping mechanism which would not properly appear in said section shown in dotted lines. Fig. 3, Sheet 3, is a sectional plan view on the dotted line $yy$ of Fig. 2. Fig. 4, Sheet 4, is a representation of so much of the machine in projection as will go on the sheet to afford a diagram for the better illustration of the successive operations. Fig. 5, Sheet 5, is a continuation of Fig. 4, showing the rest of the machine. Fig. 6, Sheet 5, is a transverse section through the dotted line $zz$ of Fig. 5. Fig. 7, Sheet 6, is a detail plan view of the knocker mechanism. Fig. 8, Sheet 6, is a detail in elevation and partly in section of the plate locking and releasing mechanism. Fig. 9, Sheet 6, is a sectional detail of the sand-dumping mechanism. Fig. 10, Sheet 6, is a plan view of Fig. 8 with the plate removed. Fig. 11, Sheet 6, is a sectional detail of the sifting mechanism. Fig. 12, Sheet 6, is a side elevation through the dotted line $ll$ of Fig. 11, looking to the left.

The same letters of reference are used to indicate identical parts in all the figures.

Under its preferred form of construction my machine is intended to operate simultaneously upon eleven flasks arranged horizontally in a circle and carried upon intermittingly-moving trucks, so that during and after each simultaneous movement of the trucks one of the operations necessary in molding is performed upon each flask, and so that after each simultaneous movement of the trucks a finished drag and cope are taken from the machine at one point and an empty two-part flask placed in the machine at another or the starting point.

For instance, as a preliminary description to give an idea of the successive operations, reference is made to Figs. 4 and 5, where the machine is shown in projection or straightened out and the positions of the flasks are numbered from 1 to 11 consecutively. Here A represents the trucks abutting end to end and having flanged wheels $a$, traveling on tracks on a table B, supported by posts C. There is a two-part flask $b\,c$ on each truck, of which $b$ is the cope and $c$ the drag, and interposed between the two parts of each flask is a pattern-plate $d$, with its patterns, as seen in Fig. 6. A sand-delivering trough D is arranged directly over the flasks with discharge hopper-boxes and screening mechanism. At position 1, Fig. 4, the facing-sand is sifted from box E to cover the patterns in the cope side. At position 2 sand is dropped from box F to fill and heap up the cope side of the flask. At position 3 a rammer K packs the sand in the cope side. In moving from position 3 to position 4 the cope side is carried under a stationary scraper G, which scrapes off the superfluous sand. At position 4 an attendant places a backing-plate on the top of the cope side. At position 5 the two-part flask is clamped by the attendant by clamping-bolts carried on horizontal pivots, the section of track and the truck below the flask is lowered, the flask still clamped and suspended is turned over, so that the packed cope side is underneath and the empty drag side is on top, the track and the truck are raised so that the flask again rests on the truck, and the bolts are disconnected to permit the truck with the flask on it to travel to position 6. At position 6 facing-sand is sifted from box H on the patterns in the drag side. At position 7 sand is dropped from the box I to fill and heap up the drag side. At position 8 a second rammer K packs the sand in the drag side and a stationary scraper J scrapes off the superfluous sand as the flask travels under it from position 8 to position 9. At positions 9, 10, and 11 the three trucks rest on a vertically-movable section of table L, Fig. 5, subjected to continuous rapping, and at position 9 a backing-plate is put on the drag side and the handles of the drag side are engaged by shoulders $e$ on suspended arms M. The table L is then lowered, separating the cope from the drag and carrying the former down with it, while the drag is lifted off the machine finished with the exception of the gateways to be formed in the usual manner. When the table is brought up again, an empty half is placed on the cope. At position 10 the flask is clamped and turned over during the descent of the table, bringing the cope on top and the empty half on the truck, just as at position 5. At position 11 the cope is suspended, as at position 9, while the empty half with the pattern-plate on it is carried down by the table. The cope is then lifted off the machine finished, another empty half is placed upon the empty half on the truck, and these two next move to position 1, and so on continuously with the requirement of but two attendants, one at position 5 and the other at the table L.

Having thus stated in a general way what the machine is intended to accomplish and the successive operations on each flask, (though eleven are being acted on simultaneously,) I will now describe the machine in detail.

The table B is a horizontal annular one, Figs. 2 and 3, supported on posts C and having the tracks $f$ on which the trucks A travel. Above and in vertical alinement with the table is the annular sand-trough D, supported on posts N, to which it is secured in any suitable manner. Within the annular table and substantially flush therewith is a horizontal shifter-plate O, having a vertically-bored central hub $g$ on its under side, supported on a central upright frame P and journaled on the upper end thereof.

The main driving-shaft Q extends horizontally beneath the shifter O and is journaled in the upright P and in a bearing R. This shaft is driven in any suitable manner, and in the present instance I have shown it provided with a worm-wheel S, engaging with a worm T on a shaft U, revolved by pulleys V, secured thereon. Upon the hub $g$ of the shifter-plate O is secured a beveled gear W, with which a mutilated beveled gear X, fast on the shaft Q, meshes at every revolution of the shaft Q to turn the shifter O one-eleventh of a revolution. These gears are so constructed and the speed of the machine so timed that it takes thirty seconds for the complete revolution of the shaft Q and the gear X, of which time during five seconds the plate O, trucks, and flasks are being shifted, and during the other twenty-five seconds the plate, trucks, and flasks are at rest and the various operations are being performed on the flasks. This time I consider ample, but, if desired, it may be increased. To prevent the plate O and the trucks carried by it from moving too far, I provide a spring-bolt $h$, Figs. 2, 8, and 9, carried in a suitable guide Y, which engages successively a series of holes on the under side of the plate and which is withdrawn to unlock the plate just at the moment the mutilated gear X is in position to mesh with gear W by means of an arm or projection $i$ on gear X, engaging a pin $j$, projecting from the bolt $h$ through a slot in the guide Y. As soon as the plate starts to turn the arm $i$ passes the pin $j$ and releases the bolt, which is projected by its spring into contact with the under side of the plate until just as the teeth of the gear X leave the gear W a locking-hole rides over the bolt, which is projected into it to relock the plate, as will be readily understood.

The plate O engages the trucks A by means of vertical ribs $k$ upon its periphery entering notches upon the inner edges of the truck-platforms, as seen in Figs. 2 and 3. The ribs $k$ in this instance are in pairs upon the periphery of the plate and upward extensions $l$ therefrom, and the inner edges of the truck-platforms are cut away between the ribs to permit the backing-plates of the flasks to project sufficiently to be engaged by the clamping-bolts, to be presently described.

To drive the sand-sweeps, the sifting mechanisms, and the rammers, I provide a vertical shaft A', journaled through the center of the plate O at its bottom in the step $m$, and at its upper end in a cross-piece B', supported by other cross-pieces C', secured to the trough D. There is a beveled gear D', fast on the shaft A', beneath the gear W, which meshes with a smaller beveled gear E', fast on the inner end of the shaft Q, Fig. 2.

The gear D' is twice the diameter of the gear E', so that for every complete revolution of the shaft Q the shaft A' makes just one-half of a revolution. Secured upon the upper end of the shaft A' are two diametrically-set horizontal arms E'', projecting over the open top of the trough D, and each carrying a sweep F' F'', which extends into and fills the trough transversely. There are two sets of openings G' H' through the bottom of the trough, (see Fig. 1,) of which the two G' open into the sieve-boxes E H and the two H' into the hopper-boxes F I, Fig. 4.

Fast upon the shaft A', beneath its bearing in the cross-piece B', is a double beveled gear I', and journaled in suitable bearings on the under side of the trough are two horizontal crank-shafts J', Figs. 1 and 2, placed almost diametrically to each other and having on their inner ends beveled gears K', meshing with the teeth on the under side of the gear I'. The gears K' are just half the diameter of the gear I', so that the shafts J' have the same speed that the shaft Q has. Upon each crank of the shafts J' is a pitman $n$, whose lower end is pivoted to the upper end of a hollow plunger $o$, guided in the tubular stem $p$ of the rammer K, which is also vertically guided in the bearing $q$, secured to the hanger $r$, Fig. 2. A coiled spring $s$, confined in the plunger $o$, bears at its lower end against the rammer and serves to lessen the jar when the rammer strikes the sand in the flask, while a collar $t$ on the plunger engages a shoulder in the stem of the rammer to lift the same.

Suitably journaled in bearings $u$, Figs. 1, 11, and 12, are two horizontal shafts $L'$, set almost diametrically to each other and having upon their inner ends small beveled pinions $M'$, meshing with the teeth on the upper side of the gear $I'$, while upon their outer ends are small ratchet-wheels $N'$, revolving close to the inner sides of the sand-sifting boxes E H. These boxes are hung on horizontal slides $v$ on the trough under the openings $G'$ and their open lower ends are covered with sifting-screens $w$. A spring $a'$, Fig. 12, is applied to one end of each box, and the ratchet $N'$ engages with a projection $b'$ on the side of the box, so that as the ratchet revolves the box is shaken, being moved in one direction by the ratchet and in the opposite direction by the spring, as will be readily understood. The hopper-boxes F I, which are identical in construction, are under the openings $H'$ in the trough. In the lower end of each is a coarse screen $c'$, Fig. 10. The bottom $O'$ of the box is hinged at one side and held normally closed by a spring-latch $P'$ upon a rod $d'$, pivoted on the under side of the trough, and having at its outer end an arm $h'$, projecting up by the side of the trough in the path of a tripping-arm $Q'$, extending rearwardly from each sweep and of such length that the sweep will have filled the box with sand and passed over it before the latch is tripped to release the bottom $O'$. As soon as it is released the weight of the sand throws it open and the sand falls into the flask below. As soon as the sand is discharged a counterweight $e'$, secured to a cord $f'$, passing over a pulley $g'$, draws the bottom up and it becomes automatically engaged by the latch $P'$.

The section of table $Q''$, Fig. 4, directly under the truck at position 5 is carried upon a frame $R'$ between two of the posts C, which serve as guides for the friction-rollers $i'$, journaled on the frame, so that the section of table and the frame can be lowered and raised vertically. Counterweights $S'$, secured to cords $j'$, passed over pulleys $k'$, and having their inner ends secured to the section $Q''$, tend to hold the said section up flush with the table and return it and the frame after being lowered. The edges of the section $Q''$ and the adjacent edges of the table are beveled, as shown, to prevent the section $Q''$ from rising higher than the table. The other vertically-movable section of table L, under the trucks at positions 9, 10, and 11, is identical in construction and operation with that just described, the only difference being that the latter is three times the length of the former to accommodate three trucks. Extending across from the posts C, between which are the movable sections of table L and $Q''$, and on the outer side of the table is a projecting bar $T'$, upon which at the middle is pivoted a vertical post $U'$, having inserted through its upper end a sliding horizontal rod $l'$, to which is secured a vertical clamping-bolt $m'$, provided on its ends with thumb-nuts $n'$. Removably supported in one of a series of circular-arranged holes $o'$, Figs. 3 and 6, in the table is a vertical post $p'$, directly opposite each of the posts $U'$, and having inserted through its upper end in axial alinement with the rod $l'$ a similar rod $q'$, to which is secured a vertical clamping-bolt $r'$, provided on its ends with thumb-nuts $s'$. During the shifting of the plate O and the trucks the rods $l'$ and $q'$ and clamping-bolts $m'$ $r'$ are drawn back out of the way, but when the plate comes to rest with the trucks and flasks shifted they are pushed forward and the bolts enter slots $t'$, Fig. 3, in the backing-plates of the flasks, and by turning down the upper thumb-nuts the flasks are clamped, the movable sections of table and the trucks thereon are lowered out of the way, the inner edges of the trucks sliding on the ribs $k$ without being disengaged, and the clamped flasks are turned over, with the rods $l'$ $q'$ acting as trunnions. After the flasks are turned over the sections of table and trucks are raised to again support the flasks and the thumb-nuts are loosened and the bolts drawn back out of the way to permit the next shifting of the plate O, the trucks, and the flasks.

Two posts $V'$, Figs. 5 and 6, extend down from the bar $T'$ at the section L, and pivoted, as at $u'$, is a horizontal rapping-arm $W'$, Figs. 2, 5, and 7. The inner end of the arm $W'$ has a tooth $v'$, engaging with a ratchet-wheel $Y'$, fast on the shaft $A'$. The outer end of the arm $W'$ has knocking-heads $w'$ for rapping the posts $V'$, between which they are situated, the arm $W'$ being moved in one direction by the ratchet-wheel and in the opposite direction by a spring $y'$, Fig. 7, as will be readily understood.

The supports M, Figs. 2 and 5, are preferably adjustable in length by being made telescopic, so as to regulate the height of the supporting-shoulders $e$, and when adjusted are held by set-screws $a''$. As seen in Fig. 2, the shoulders $e$ are so adjusted that the handles $b''$ of the upper half of the flask ride over them without contact, but when the movable section of table L descends these handles are caught on the shoulders and the upper half of the flask remains suspended and is then lifted out of the machine, as before described.

The scrapers G J are secured to any stationary part of the frame of the machine—in this instance to the posts N.

The operation of the machine thus constructed is as follows: Assuming that the trucks are all provided with flasks that have been acted on by previous operations, as before described in reference to Figs. 4 and 5, and that the starting-points of the sweeps (though they are continuously traveling) are indicated in Fig. 1, a quantity of sand sufficient to fill both sets of boxes E F and H I is placed in the trough at *, Fig. 1, in front of the sweep F' and a quantity of sand to fill the boxes H I is in front of the sweep F'''. While the sweeps are in the position shown in Fig. 1 the shifter O is just about to shift the trucks and flasks from one position to the next and does so before the loads of sand are swept into the boxes E F and H I. When the sweep F' gets to the position of the sweep F''', it still pushes before it sufficient sand to fill the boxes H I, after which it comes to the position of F' empty and ready to take up and push forward the double load of sand deposited at * in the trough, and so on continuously. Any suitable means may be employed for depositing the sand in the trough, such as an elevating-conveyer, or it may be shoveled there by hand in measured quantities. At positions 1 and 2 the sand is sifted and dropped into the flasks below, the sifter being in constant operation and the bottom of the box being tripped, as before described, just as the sweep passes its opening in the trough. At the same time the same operations are being performed at positions 6 and 7 and at the same time the rammers are simultaneously worked. The scrapers, however, act while the trucks are being shifted, but while the sifting, dropping, and ramming is taking place (during the twenty-five seconds the shifter O is at rest and locked) the clamping of the flasks at positions 5 and 10, the lowering and raising of the sections Q'' L, the turning of the flasks, and the separation of the flasks at positions 9 and 11 are all effected.

The posts $p'$, after each shifting of the shifter O, are taken out of their holes $o'$ by hand and inserted in the next holes $o'$ to bring them opposite the posts U', as will be readily understood.

While I prefer to construct my machine in the circular form described, yet I do not intend my invention in its broad sense to be limited to this or any other form, and so far as this feature of my invention is concerned I wish my claims to be considered as broad as the language of their terms; also, while I prefer to use shifting mechanism, yet it is evident that this might be dispensed with and the dropping mechanism alone retained. Indeed a large part of the advantages of my invention would be preserved if the sand was deposited by hand into the flasks at positions 2 and 7. Again, while I prefer to use pattern-plates the machine will work as well with loose patterns, the only requirements being that a match side with loose patterns in it is the under half at position 1. At position 5, after turning and unclamping, the match side is removed and an empty half is substituted for it. Again, at position 9, after removing the drag, a match side is substituted for it, and at position 11, after removing the cope and applying the empty half, the patterns are again placed in the match side, ready to start again at position 1.

Having thus fully described my invention, I claim—

1. In a sand-molding machine, the combination of an endless horizontal table, flask-carrying trucks guided and simultaneously movable thereon intermittingly, automatic means for moving said trucks, a vertically-movable section in said table under the path of travel of said trucks, and pivoted clamping-bolts over said movable section to support the flasks substantially as described.

2. In a sand-molding machine, the combination of an endless horizontal table for the trucks and flasks, said table having vertically-movable sections, a shifter, and suitable means to connect the said shifter to the trucks both in their normal and lowered positions.

3. In a sand-molding machine, the combination of a horizontal circular sand-trough with openings in its bottom, sand dropping and ramming mechanism beneath said trough, sand-sweeps for said trough, a horizontal circular table beneath said trough, trucks carrying flasks on said table, a horizontal shifter for intermittingly moving said trucks, and operating mechanism for the sweeps and sand dropping and ramming mechanisms, substantially as described.

4. In a sand-molding machine having a sand-delivering trough, the combination of a dropping-box on the under side of the trough, said box having a hinged bottom, a sand-sweep in the trough, a tripping-arm on said sweep, a latch for the hinged bottom, and a closing-weight for the hinged bottom, substantially as described.

5. In a sand-molding machine, the combination of a horizontal table, flask-carrying trucks upon said table, mechanism for automatically and intermittingly moving said trucks and flasks, said table having a vertically-movable section under the path of travel of said trucks, and pivoted clamping-bolts over said movable sections to support said flasks, substantially as described.

6. The combination of the shifter O, gear W fast thereto, mutilated gear X meshing with gear W, and driving-shaft Q, substantially as described.

7. The combination of the shaft, Q, gear E' fast thereon, vertical shaft A', gear D' fast on shaft A' and meshing with gear E', trough D provided with sand-passages and sweeps F'', F''', carried by shaft A', substantially as described.

8. The combination of the shaft Q, gear E' fast thereon, vertical shaft A', gear D' fast on shaft A' and meshing with gear E', trough D provided with sand-passages, sand sifting and ramming mechanisms, and gear I' for operating said sand sifting and ramming mechanisms, substantially as described.

9. In a sand-molding machine, the combination with the driving-shaft Q, the pinion E' fast on said shaft, and the vertical shaft A' provided with gear-wheel D' meshing with pinion E', whereby motion is imparted to shaft A' from the driving-shaft Q, of a ratchet-wheel Y' carried by said shaft A', posts V' by which the flasks are supported, and a rapping-arm W' arranged to vibrate between said posts and actuated by said ratchet-wheel Y', substantially as described.

10. In a sand-molding machine, the combination with the supporting-table B and trucks A mounted thereon, of the shifter-plate O having vertical ribs on its periphery to engage the grooves on the under edges of said trucks A, and means for moving said shifter and trucks, substantially as described.

WILLIAM PORTEOUS.

Witnesses:
J. THOMSON CROSS,
E. W. HARDINGHAUS.